US012731393B2

(12) United States Patent
Vaghani

(10) Patent No.: US 12,731,393 B2
(45) Date of Patent: Sep. 8, 2026

(54) MODEL TRAINING APPARATUS, MODEL TRAINING METHOD, AND COMPUTER READABLE MEDIUM

(71) Applicant: NEC Corporation, Tokyo (JP)

(72) Inventor: Darshit Vaghani, Tokyo (JP)

(73) Assignee: NEC CORPORATION, Tokyo (JP)

( * ) Notice: Subject to any disclaimer, the term of this patent is extended or adjusted under 35 U.S.C. 154(b) by 280 days.

(21) Appl. No.: 18/565,131

(22) PCT Filed: Jun. 2, 2021

(86) PCT No.: PCT/JP2021/020948
§ 371 (c)(1),
(2) Date: Nov. 29, 2023

(87) PCT Pub. No.: WO2022/254597
PCT Pub. Date: Dec. 8, 2022

(65) Prior Publication Data

US 2024/0257513 A1 Aug. 1, 2024

(51) Int. Cl.
*G06V 10/80* (2022.01)
*G06V 10/77* (2022.01)
*G06V 10/82* (2022.01)

(52) U.S. Cl.
CPC .......... *G06V 10/82* (2022.01); *G06V 10/7715* (2022.01)

(58) Field of Classification Search
None
See application file for complete search history.

(56) References Cited

U.S. PATENT DOCUMENTS

2018/0336468 A1* 11/2018 Kadav .................... G06V 20/00
2021/0166129 A1* 6/2021 Wang .................... G06N 3/045

FOREIGN PATENT DOCUMENTS

EP 3467720 A1 4/2019
WO 2017/168922 A1 10/2017

OTHER PUBLICATIONS

International Search Report for PCT Application No. PCT/JP2021/020948, mailed on Aug. 31, 2021.
Tsung-Yi Lin, Piotr Dollar, Ross Girshick, Kaiming He, Bharath Hariharan, Serge Belongie; "Feature Pyramid Networks for Object Detection", Proceedings of the IEEE Conference on Computer Vision and Pattern Recognition (CVPR), 2017, pp. 2117-2125.
Ghaisi, Golnaz et al., "NAS-FPN: Learning Scalable Feature Pyramid Architecture for Object Detection", Apr. 16, 2019, <URL: https://arxiv.org/pdf/1904.07392.pdf>, pp. 1-10.
Hirakawa, Tsubasa et al., Architecture Search for Distant Object Detection, 2020 JSAE Annual Congress (Spring), May 2020, <URL: http://mprg.jp/data/MPRG/F_group/F20200522_hirakawa.pdf>, pp. 1-6.
JP Office Action for JP Application No. 2023-573471, mailed on Jan. 7, 2025 with English Translation.
Qijie ZHAO et al., "M2Det: A Single-Shot Object Detector based on Multi-Level Feature Pyramid Network", arXiv[online], Jan. 6, 2019, [retrieved on Dec. 23, 2024], Retrieved from the Internet: <URL: https://arxiv.org/pdf/1811.04533>.

* cited by examiner

*Primary Examiner* — Joseph R Haley
(74) *Attorney, Agent, or Firm* — Sughrue Mion, PLLC

(57) ABSTRACT

In one aspect, a model training apparatus includes at least one memory storing instructions; and at least one processor configured to execute the instructions to: —estimate a value of the number of FPN blocks included in an ACNN model by using a training dataset, and train the ACNN model by using the estimated value.

6 Claims, 10 Drawing Sheets

| Class id (C0) | #object (C1) | #Feature points (C2) | Average Feature points (AFP) (C3) | Complexity* (C4) | Count Estimated (C5) |
|---|---|---|---|---|---|
| 1 | 500 | 22300 | 44.6 | Medium | 4 |
| 2 | 703 | 16240 | 23.1 | Low | 2 |
| 3 | 949 | 4774 | 5.03 | Low | 1 |
| 4 | 169 | 8150 | 48.22 | Medium | 4 |
| 5 | 245 | 6584 | 26.87 | Low | 2 |

Fig. 8

| Class id (C10) | #object (C11) | #Feature points (C12) | Average Feature points (AFP) (C13) | Complexity* (C14) | Count Estimated (C15) |
|---|---|---|---|---|---|
| 1 | 710 | 62573 | 88.013 | High | 8 |
| 2 | 1503 | 40897 | 27.21 | Medium | 2 |
| 3 | 549 | 4952 | 9.02 | Low | 1 |
| 4 | 669 | 49888 | 74.57 | High | 7 |

Fig. 9

MODEL TRAINING APPARATUS, MODEL TRAINING METHOD, AND COMPUTER READABLE MEDIUM

This application is a National Stage Entry of PCT/JP2021/020948 filed on Jun. 2, 2021, the contents of all of which are incorporated herein by reference, in their entirety.

TECHNICAL FIELD

The present disclosure relates to a model training apparatus, a model training method, and a non-transitory computer readable medium.

BACKGROUND ART

In the last decade, the method of an Artificial Convolutional Neural Network (ACNN) has become popular and the state-of-the-art solutions for several vision processing applications like classification, object detection, semantic segmentation and so forth.

As an example of the related art, Patent Literature 1 (PTL 1) discloses a learning method to improve performance of a Convolutional Neural Network (CNN) by using Feature Up-sampling Networks.

CITATION LIST

Patent Literature

PTL 1: EP3467720 A1

SUMMARY OF INVENTION

Technical Problem

In the field of the ACNN, Feature Pyramid Network (FPN) technique was recently developed. To achieve high accuracy, more FPN blocks in the ACNN model are required. However, the more FPN blocks the ACNN model includes, the more execution time it takes. For this reason, there is a problem of trade-off relationship between the accuracy and the execution time.

An object of the present disclosure is to provide a model training apparatus, a model training method, and a non-transitory computer readable medium capable of providing time efficient method to determine the optimal FPN count parameter value for an ACNN model.

Solution to Problem

According to a first aspect of the disclosure, there is a model training apparatus that includes: at least one memory storing instructions; and at least one processor configured to execute the instructions to: estimate a value of the number of Feature Pyramid Network (FPN) blocks included in an Artificial Convolutional Neural Network (ACNN) model by using a training dataset; and train the ACNN model by using the estimated value.

According to a second aspect of the disclosure, there is a model training method that includes: estimating a value of the number of FPN blocks included in an ACNN model by using a training dataset; and training the ACNN model by using the estimated value.

According to a third aspect of the disclosure, there is provided a non-transitory computer readable medium storing a program for causing a computer to execute: estimating a value of the number of FPN blocks included in an ACNN model by using a training dataset; and training the ACNN model by using the estimated value.

Advantageous Effects of Invention

According to the present disclosure, it is possible to provide a model training apparatus, a model training method, and a non-transitory computer readable medium capable of providing time efficient method to determine the optimal FPN count parameter value for the ACNN model.

BRIEF DESCRIPTION OF DRAWINGS

FIG. 8 is an example of a table indicating result of estimation based on a training dataset TD.

FIG. 9 is another example of a table indicating result of estimation based on the training dataset TD.

DESCRIPTION OF EMBODIMENTS (Outline of Related Art)

Prior to explaining embodiments according to this present disclosure, an outline of related art is explained. The following related art is disclosed in "Feature Pyramid Networks for Object Detection", Tsung-Yi Lin, Piotr Dollar, Ross Girshick, Kaiming He, Bharath Hariharan, Serge Belongie; Proceedings of the IEEE Conference on Computer Vision and Pattern Recognition (CVPR), 2017, pp. 2117-2125, incorporated herein by reference as forming part of this document.

Figure 1:
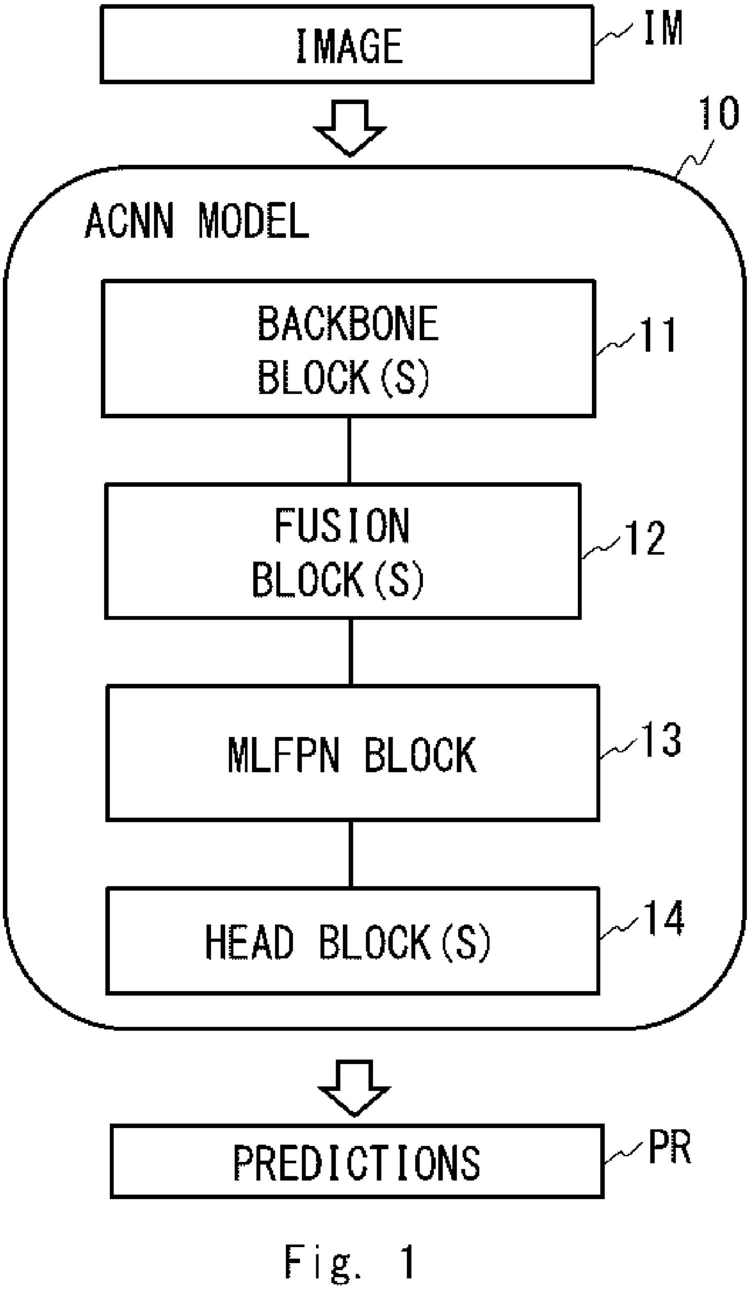
FIG. 1 is an example of a block diagram of an ACNN model according to related art.

In FIG. 1, an ACNN model 10 (hereinafter referred to as the ACNN 10) is illustrated. The ACNN 10 comprises several vital blocks, specifically Backbone block(s) 11, Fusion block(s) 12, a Multi-Level Feature Pyramid Network (MLFPN) block 13 and Head block(s) 14 as shown in FIG.

1. The ACNN 10 takes an Image IM as input, processes it and outputs Predictions PR based on the Image IM. The architecture of each block in the ACNN 10 is designed with the aim to achieve high accuracy for the given dataset. Also, for real time application, the architecture in the ACNN 10 is designed with the additional aim to achieve desired execution speed.

The Backbone block(s) 11 function as backbone convolutional architectures and the Fusion block(s) 12 integrate data input from the Backbone block(s) 11. The Head block(s) 14 are convolutional layers of Residual Network (ResNet).

Figure 2:
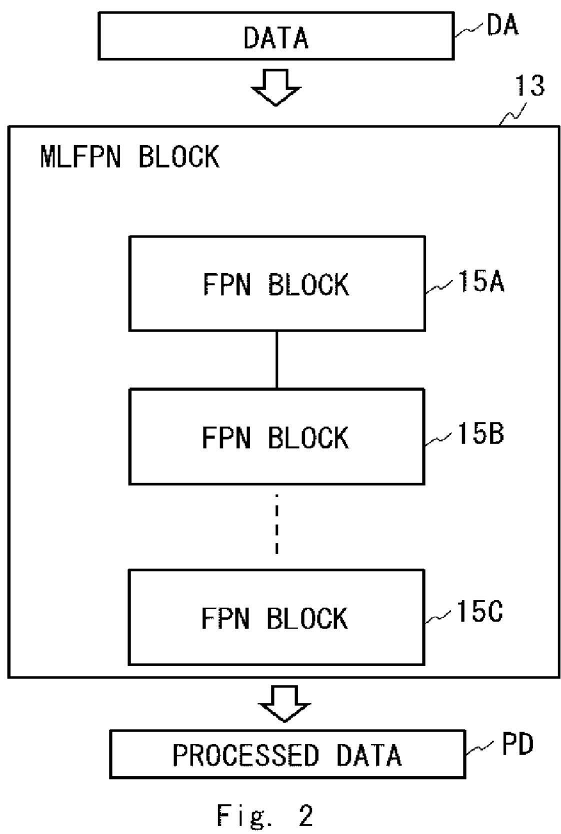
FIG. 2 is an example of a MLFPN block according to the related art.

The MLFPN block 13 is one of the key components in the ACNN 10. As shown in FIG. 2, the MLFPN block 13 is formed by stacking multiple levels of Feature Pyramid Network (FPN) blocks 15 and hence, it is known as a "Multi-Level Feature Pyramid Network block".

Figure 3:
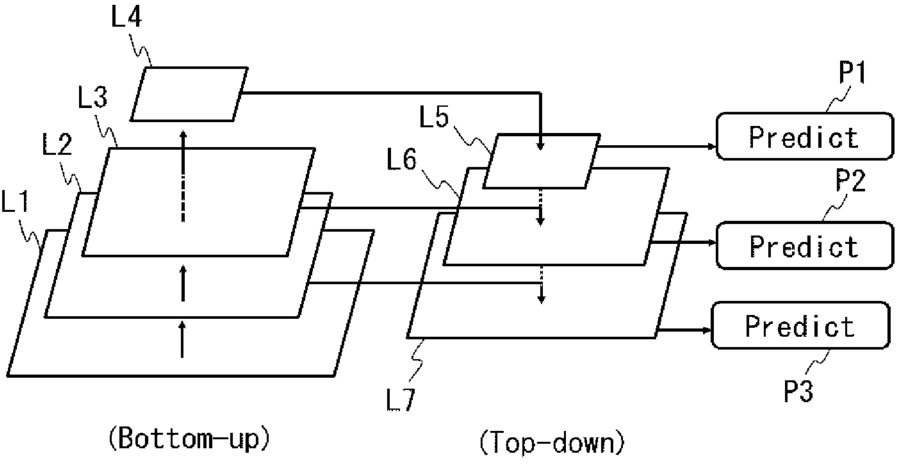
FIG. 3 is an example of a FPN block according to the related art.

The FPN block 15 is a feature extractor block designed for detecting objects of various scales in the input images. A sample example of the FPN block 15 is as shown in FIG. 3. FIG. 3 shows the FPN block 15's architecture including Layers L1, L2, L3, . . . , L4, L5, . . . , L6 and L7. Each of the Layers L1 to L4 at bottom-up steps generates different scale of feature map and each of the Layers L5 to L7 at top-down steps outputs a Prediction based on the feature map from the corresponding Layer at the bottom-up steps. For example, the Layer L5 outputs the Prediction P1 using the feature map from the Layer L4, the Layer L6 outputs the Prediction P2 using the feature map from the Layer L3 and the Layer L7 outputs the Prediction P3 using the feature map from the Layer L2. Traditionally, architecture of one FPN block 15 is optimized by experts and then such optimized FPN blocks 15A, 15B, . . . 15C are stacked to form the MLFPN block 13.

Having multiple levels of the FPN blocks 15 in the MLFPN block 13 is necessary to achieve high accuracy by the ACNN 10. However, increasing the levels of the FPN blocks 15 in the MLFPN block 13 results in large computational complexity of the ACNN 10 and thereby increasing the execution time of the ACNN 10. The large execution time is inadmissible in the real time applications. Also, having one or few levels of the FPN blocks 15 in MLFPN block 13 to enjoy less computational complexity and smaller execution time may result in low accuracy. Hence, the number of the FPN blocks 15 in the MLFPN block 13 is an important parameter of the ACNN 10 and will be referred to as a FPN count value in this document. Determining optimal value of the FPN count value with considering the tradeoff between accuracy and computational complexity or execution time for the given real time application and dataset is an optimization problem.

The naive solution for the optimization problem is exhaustively enumerating all the candidate values for the FPN count. However, the total time required in enumerating all candidate values is a product of the number of candidate values and time for training respective ACNN model on the given dataset. Therefore, as the FPN count parameter can have multiple positive integers as candidate options, the total time required to exhaustively enumerate may be very large.

Another solution for this problem is using machine learning algorithm like Reinforcement learning, Genetic algorithm and so forth to solve the optimization problem. These machine learning algorithms basically explore few candidate values and predict an optimal FPN count value. However, time required for even exploring few candidate values becomes also large.

In view of this related art, one of the objects of the present disclosure is to provide time efficient method to determine the optimal FPN count parameter value of the MLFPN block in the ACNN.

First Example Embodiment

First, a model training apparatus 100 according to a first example embodiment of the present disclosure is explained with reference to FIG. 4.

Figure 4:
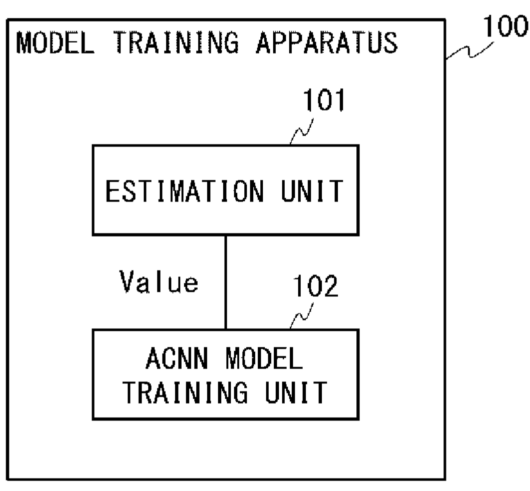
FIG. 4 is an example of a block diagram of a model training apparatus according to a first example embodiment.

Referring to FIG. 4, the model training apparatus 100 includes an estimation unit 101 and an ACNN model training unit 102. The model training apparatus 100 includes, for example, one or a plurality of computers or machines. As an example, at least one of components in the model training apparatus 100 can be installed in a computer as a combination of one or a plurality of memories and one or a plurality of processors.

The estimation unit 101 estimates a value of the number of FPN blocks included in an ACNN model by using a training dataset (not shown in FIG. 4). The ACNN model training unit 102 uses the value output by the estimation unit 101 to train the ACNN model. The FPN blocks can be stacked in, but not limited to, MLFPN structure, Single Shot Multibox Detector (SSD)-style feature pyramid structure, or FPN-style feature pyramid structure. For example, the structure of the ACNN model comprising the MLFPN block is shown in FIGS. 1 and 2 and its structure is explained in "Outline of related art"; therefore, the explanation of its detail is omitted here.

Next, referring to a flowchart in FIG. 5, an example of the operation of the present example embodiment will be described.

Figure 5:
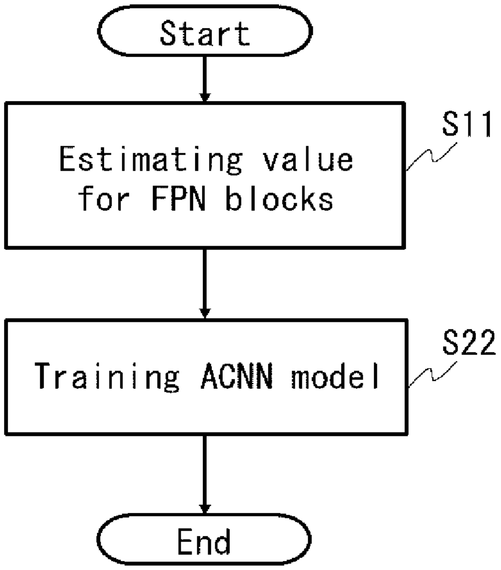
FIG. 5 is a flowchart illustrating an example of a method of the model training apparatus according to the first example embodiment.

First, the estimation unit 101 estimates the value of the number of FPN blocks included in the ACNN model by using the training dataset (step S11 in FIG. 5). Next, the ACNN model training unit 102 trains the ACNN model by using the estimated value (step S12 in FIG. 5).

As the estimation unit 101 estimates the value indicating the number of FPN blocks required for the ACNN model, the ACNN model training unit 102 trains the ACNN model to make the number of FPN blocks minimum necessary. Therefore, it is possible to provide time efficient method to determine the optimal FPN count parameter value for the ACNN model.

Second Example Embodiment

Next, a second example embodiment of this disclosure will be described below referring to the accompanying drawings. This second example embodiment shows one of the specific examples of the first example embodiment, however, specific examples of the first example embodiment are not limited to this.

Figures 6, 7:
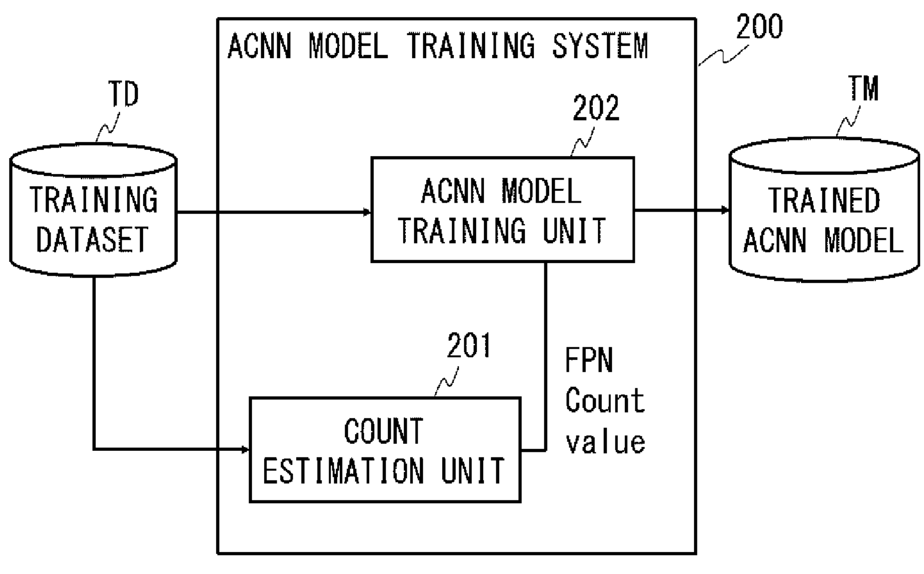
FIG. 6 is an example of a block diagram of an ACNN model training system according to a second example embodiment.
FIG. 7 is an example of a block diagram of a count estimation unit according to the second example embodiment.

FIG. 6 shows an ACNN model training system (hereinafter referred to as the model training system) according to a second example embodiment. As shown in FIG. 6, the model training system 200 includes a count estimation unit 201 and an ACNN model training unit (hereinafter referred to as the model training unit) 202. The model training system 200 takes a training dataset TD as input and outputs a trained ACNN model.

The model training system 200 can be realized as a system installed in an information processing apparatus. The model training system 200 may include other units for computation. In this example embodiment, the model training system 200 can be applied to the image recognition, however, the application is not limited to this.

The training dataset TD includes images along with the label(s) of each image and ground truth bounding box information. The label is a prediction which the model training system 200 seeks to procure as output of the ACNN. The ground truth bounding box information is used for cropping by the feature point extraction unit 211.

The count estimation unit 201 takes the training dataset TD as input and performs complexity analysis of the training dataset TD to estimate FPN count parameter's values and output them.

FIG. 7 shows the detail of the count estimation unit 201. As shown in FIG. 7, the count estimation unit 201 includes a feature point extraction unit 211 and an estimation unit 212. The feature point extraction unit 211 takes the training dataset TD as the input and generates filtered feature points for all training dataset images as output.

The estimation unit 212 takes the filtered feature points as input and perform the feature point analysis to provide a value of the FPN count parameter as output. For the feature point analysis, the estimation unit 212 performs summation of the number of objects in each target class of the training dataset TD and summation of the number of feature points of all object in each class.

FIG. 8 shows an example of a table indicating the result of the estimation based on the training dataset TD. In the table of FIG. 8, the column C0 shows Class ids in each target class, the column C1 shows sample examples of the number of the objects in each target class, and the column C2 shows sample examples of the total number of the feature points in each target class.

The estimation unit 212 uses the information of the number of the objects in each target class and the total number of the feature points in each target class (information of the columns C1 and C2) and calculates the Average Feature Points (AFP) value as shown in the column C3 in the table of FIG. 8. The AFP value can be calculated by dividing the total number of the feature points by the number of the objects. Then the estimation unit 212 uses the information of the AFP value and estimates the complexity in each target class as shown in the column C4 in the table of FIG. 8. The higher the AFP value, the higher the complexity. After that, the estimation unit 212 calculates the information of the count in each target class based on the complexity as shown in the column C5 in the table of FIG. 8. The higher the complexity, the higher the count value.

FIG. 9 shows another example of a table indicating the result of the estimation based on the training dataset TD. In the table of FIG. 9, the columns C10 to C15 correspond to the columns C0 to C5 respectively.

FIGS. 8 and 9 show that the target class with smaller AFP value can be regarded as low complex and assigned to a smaller value of the count. On the other hand, the target class with higher AFP values can be regarded as high complex and assigned to a larger count value.

The low complex dataset requires a less complex deep CNN model. In other words, few numbers of FPN blocks in a MLFPN unit are sufficient for achieving good accuracy on a low complex dataset. On the other hand, the high complex dataset requires a high complex deep CNN model. In other words, large number of FPN blocks in a MLFPN unit are required for the achieving good accuracy on a high complex dataset. Hence, by using the number of the AFP values as the complexity analysis metric, the FPN count value for each target class can be estimated.

The estimation unit 212 outputs the maximum value in the column C5 or C15 as the FPN count parameter value, which is also output of the count estimation unit 201. In the case of FIG. 8, as the value "4" is the maximum value in the column C5, the estimation unit 212 outputs the value "4". In the case of FIG. 9, as the value "8" is the maximum value in the column C15, the estimation unit 212 outputs the value "8".

Referring back to FIG. 6, the model training unit 202 uses the FPN count parameter value and training dataset TD as input, trains a ACNN model and outputs a trained ACNN model TM as shown in FIG. 6. The ACNN model trained by the model training unit 202 is stored in the model training system 200 and its structure is shown in FIGS. 1 and 2. The explanation of the structure is already described in "Outline of related art"; therefore, it is omitted here.

Next, referring to the flowchart in FIG. 10, an example of the total processes of the model training system 200 will be described.

Figure 10:
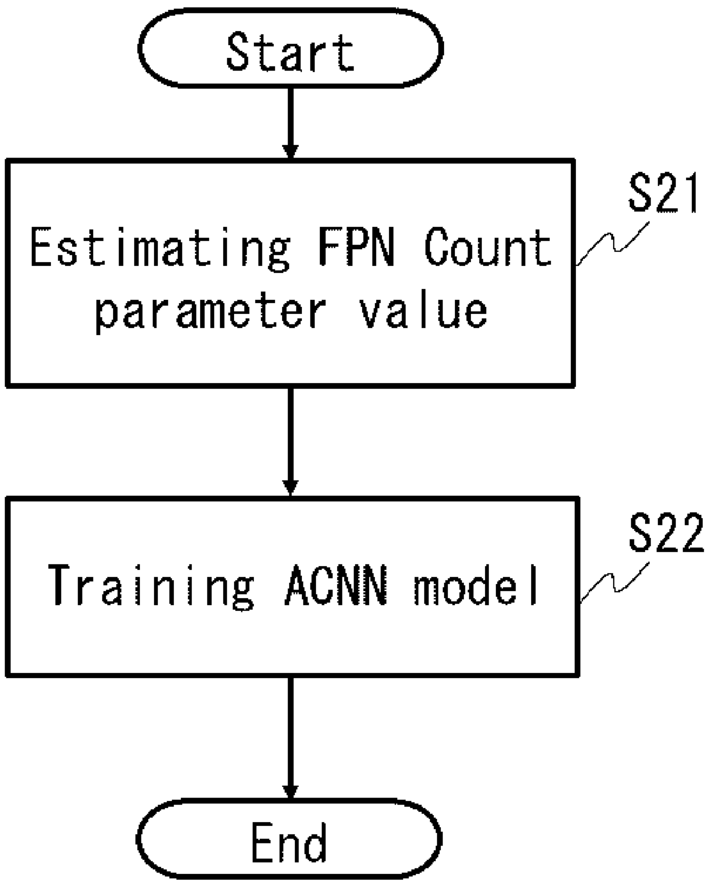
FIG. 10 is a flowchart illustrating an example of total processes of the ACNN model training system according to the second example embodiment.

First, the count estimation unit 201 estimates the FPN count parameter value from the training dataset TD and outputs it (step S21 in FIG. 10). Second, the model training unit 202 uses the FPN count parameter value and training dataset TD as input, trains the ACNN model and outputs the trained ACNN model TM (step S22 in FIG. 10).

Furthermore, referring to the flowchart in FIG. 11, an example of the processes of the count estimation unit 201 will be described. In other words, the detail of the process of step S21 will be shown below.

Figure 11:
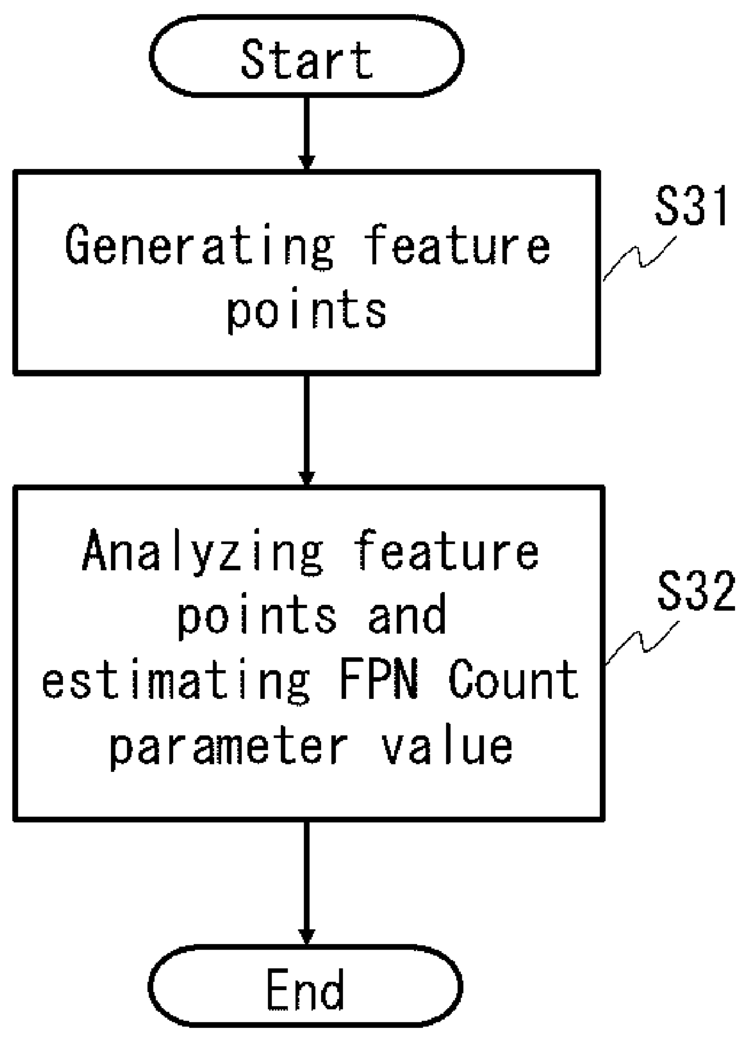
FIG. 11 is a flowchart illustrating an example of processes of a count estimation unit according to the second example embodiment.

First, the feature point extraction unit 211 takes the training dataset TD as the input and generates filtered feature points for all the training dataset images as output (step S31 in FIG. 11). Second, the estimation unit 212 analyzes the feature points and estimates the FPN count parameter value (step S32 in FIG. 11).

Furthermore, referring to the flowchart in FIG. 12, an example of the processes of the feature point extraction unit 211 will be described. In other words, the detail of the process of step S31 will be shown below.

Figure 12:
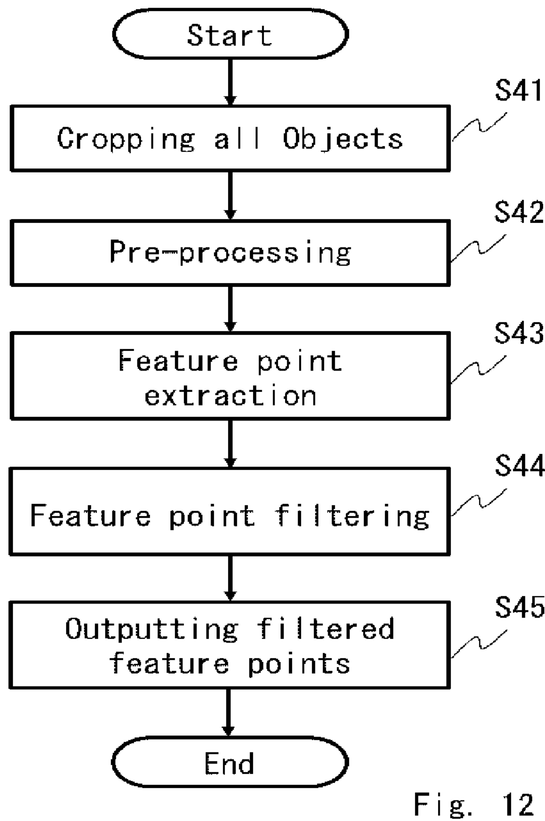
FIG. 12 is a flowchart illustrating an example of processes of a feature point extraction unit according to the second example embodiment.

First, the feature point extraction unit 211 crops all the objects as individual images by using the ground truth bounding box information in the training dataset TD (step S41 in FIG. 12). This cropping is done in order to avoid future analysis on background and also segregate all objects in the training dataset TD (all images). The future analysis means the processes at steps S43 to S45 and S32. The background area without the object of interests may not be subject to this future analysis in terms of time cost. However, if the training dataset TD contains one object per image and with minimal background, then the step S41 is optional and thereby can be skipped. The output of this cropping process will be individual images of all target objects in the training dataset TD. In the case of FIG. 8, the feature point extraction unit 211 generates the information of the column C1 at the step S45. In the case of FIG. 9, the feature point extraction unit 211 generates the information of the column C11 at the step S45.

Second, the feature point extraction unit 211 pre-processes all the input images and outputs the pre-processed images (step S42 in FIG. 12). The pre-processing includes, but not limited to, the process of resizing the different resolution images. This image pre-processing is done in order to normalize all the objects across different scales and classes. However, if in the training dataset TD, all the objects are of same scale in all class, then the step S42 is optional and thereby can be skipped.

Third, the feature point extraction unit 211 performs feature points extraction on all processed images (step S43 in FIG. 12). The Feature point is a spatial location or point in an image that defines what is interesting or noticeable in the image. The other name of the feature point can be a key point or an interest point in the image. There could exists a plurality of such feature points in the image, therefore, there would be one or more extracted feature points by the extraction.

Figure 13:
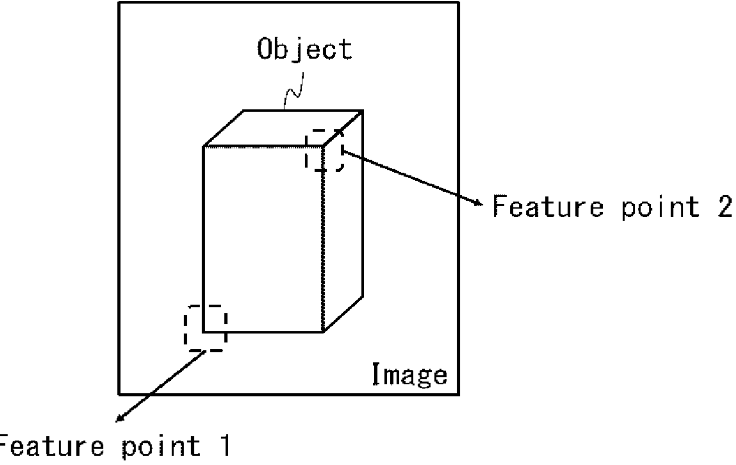
FIG. 13 is an example of feature points in an image.

FIG. 13 shows a sample example of feature points (key points) in an image. As shown in FIG. 13, the image contains an object (rectangular) and the object has several edges, which defines the shape of the rectangular. Feature points 1 and 2 in FIG. 13 are examples of these edges. Also, the edges of the rectangular can be extracted as the feature points.

Figure 14:
FIG. 14 is an example of Scale-Invariant Feature Transform (SIFT) feature point extraction on a particular image.
Figure 14:
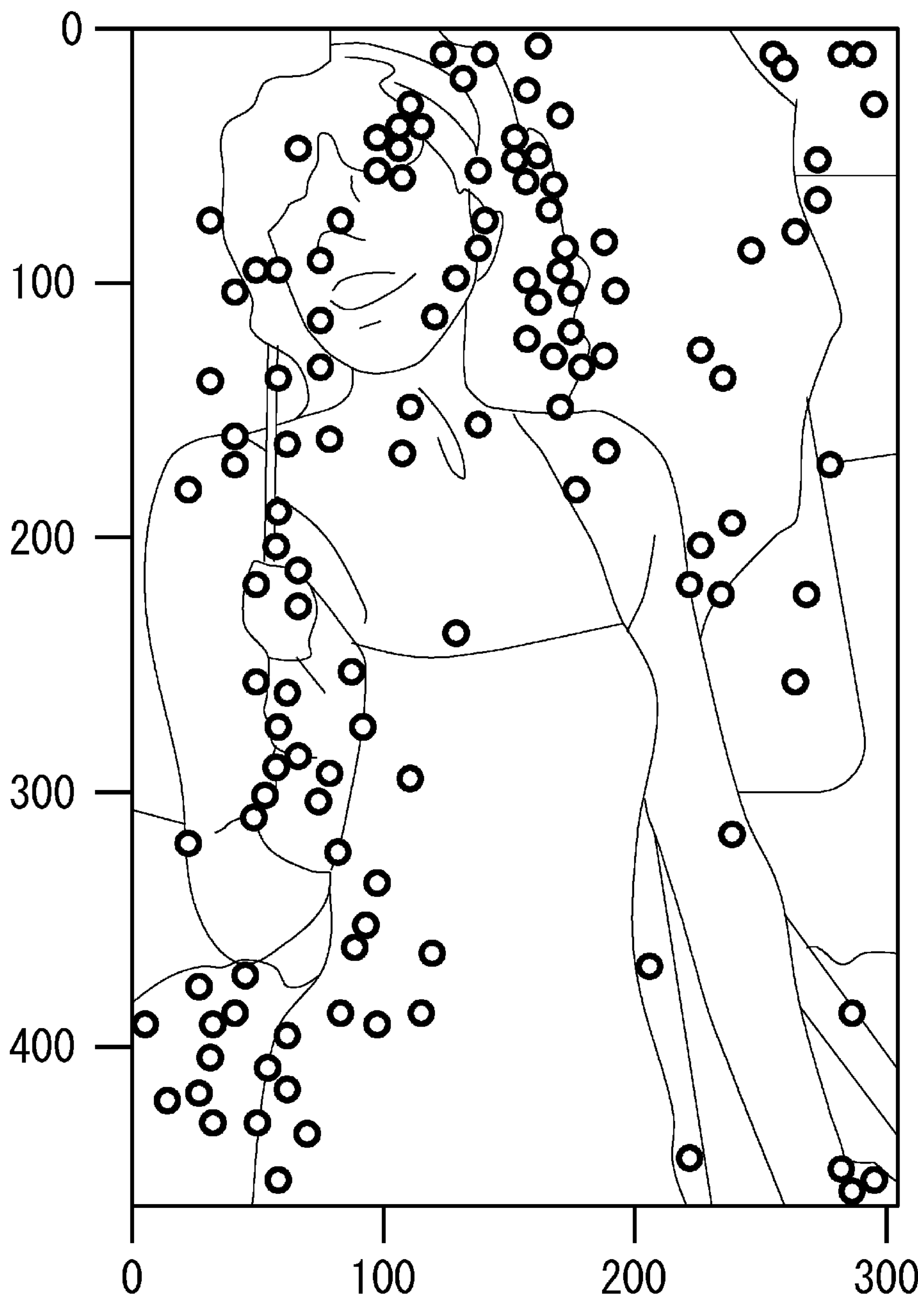

There exist several well-known feature point extraction techniques like Scale-Invariant Feature Transform (SIFT), Speeded up robust features (SURF), Binary Robust Invariant Scalable Feature points (BRISF) and so on. FIG. 14 shows a sample example of the SIFT feature point extraction applied on a particular image. The image contains a portrait of a person. The feature points are represented by small circles at the interest points in the particular image in FIG. 14. The interest points in FIG. 14 can be used for detecting features (especially the person). The number of extracted feature points varies with the image on which the feature point extraction technique is applied. Generally, if the number of the extracted feature points is few in the particular image, then the particular image is termed as a simple image. On the other hand, if the number of the extracted feature points are large in the particular image, then the particular image is termed as a complex image.

Referring back to FIG. 12, after the step S43, the feature point extraction unit 211 filters the extracted feature points in each image accordingly (step S44 in FIG. 12). This filtering is an optional step, but it can be required in the case where some of the extracted feature points belong to the background. Another case where the filtering can be required is when some feature points belonging to specific categories are to be filtered out. For example, some feature points are too small or too big, they are to be filtered out.

Finally, the feature point extraction unit 211 outputs the filtered feature points for all images (step S45 in FIG. 12). In the case of FIG. 8, the feature point extraction unit 211 outputs the information of the column C2 at the step S45. In the case of FIG. 9, the feature point extraction unit 211 outputs the information of the column C12 at the step S45. After that, the estimation unit 212 estimates the FPN count parameter value using the filtered feature points. In the case of FIG. 8, the estimation unit 212 calculates the parameters in the columns C3 to C5. In the case of FIG. 9, the estimation unit 212 calculates the parameters in the columns C13 to C15. The detail of this calculation is explained above.

It should be noted that the application of this Feature point extraction technique on the training dataset TD only needs to be done once. Furthermore, the calculation in the feature point extraction unit 211 of the count estimation unit 201 is not so complex and there is no need to repeat the ACNN model training process. Consequently, the proposed method is faster than other existing method.

As explained above, one of the problems of the related art is difficulty in exploring several candidate values for the FPN count architecture parameter in the MLFPN block of the ACNN. The reason of this problem is that there exist several candidate values to be explored for the FPN count architecture parameter. Also, there exists tradeoff between the computational complexity and accuracy.

As the count estimation unit 201 estimates the value indicating the number of FPN blocks required for the ACNN model, it is possible to provide time efficient method to determine the optimal FPN count parameter value in the ACNN model. Furthermore, in this example embodiment, the ACNN model includes a MLFPN block comprising FPN blocks and the count estimation unit 201 estimates the value of the number of FPN blocks to be stacked in the MLFPN block. Therefore, ACNN model training system 200 can train the ACNN model including the MLFPN block.

Furthermore, the estimation unit 212 estimates the value of the number of FPN blocks based on the number of objects and feature points for each target class in the training dataset TD. As a result, the ACNN model training unit 202 can set the level of FPN blocks corresponding to the contents of images.

Furthermore, the estimation unit 212 calculates each value of the number of FPN blocks for each target class and outputs the max value of the number of FPN blocks for each target class as the estimated value. Therefore, the ACNN model training unit 202 can set the level of FPN blocks as the minimum value, while the parameter of FPN blocks ensures that the calculation result by the ACNN model is correct.

Furthermore, the feature point extraction unit 211 extracts feature points on images in the training dataset TD and uses the feature points to estimate the value of the number of FPN blocks. Consequently, the ACNN model training unit 202 can set the level of FPN blocks in order to make the ACNN model suitable for distinguish objects.

Furthermore, the feature point extraction unit 211 filters the extracted feature points and the estimation unit 212 uses the filtered feature points to estimate the value of the number of FPN blocks. The count estimation unit 201 can set the value as minimum as far as possible, therefore, the level of FPN blocks can be smaller.

Next, a configuration example of the information processing apparatus explained in the above-described plurality of embodiments is explained hereinafter with reference to FIG. 15.

Figure 15:
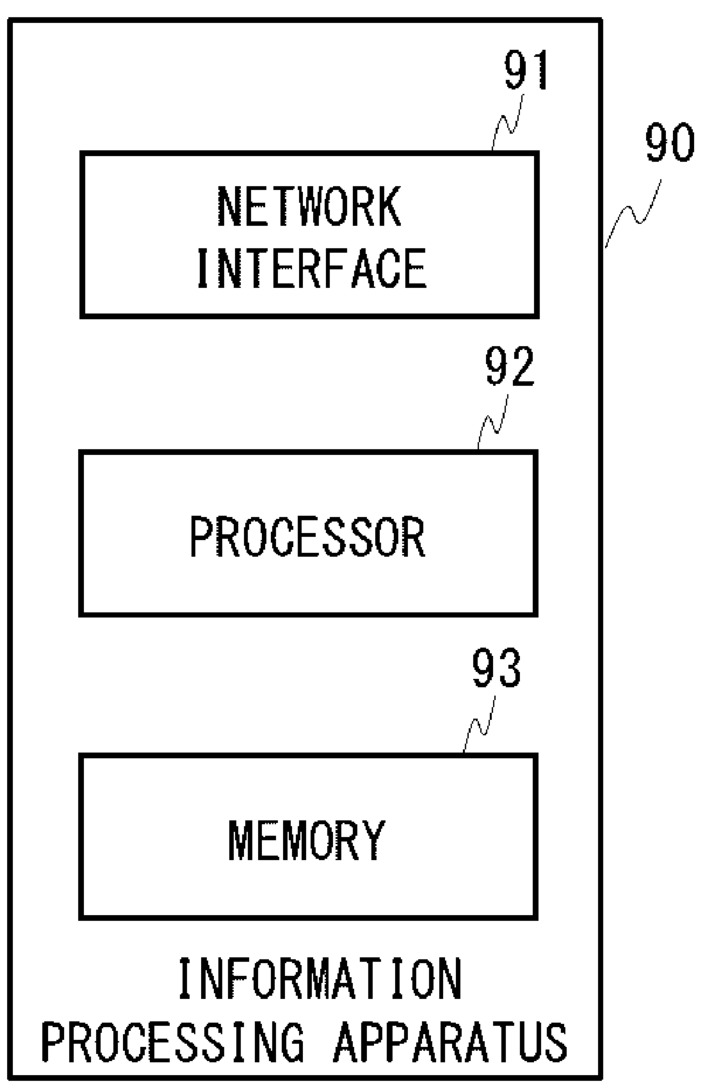
FIG. 15 is an example of a block diagram of a computer apparatus according to embodiments.

FIG. 15 is a block diagram showing a configuration example of the information processing apparatus. As shown in FIG. 15, the information processing apparatus 90 includes a network interface 91, a processor 92 and a memory 93.

The network interface 91 is used for communication with other network node apparatuses forming a communication system. For example, the network interface 91 may receive the training dataset TD.

The processor 92 performs processes explained with reference to the drawings in the above-described embodiments by loading software (a computer program) from the memory 93 and executing the loaded software. The processor 92 may be, for example, a microprocessor, an MPU (Micro Processing Unit), or a CPU (Central Processing Unit). The processor 92 may include a plurality of processors. In this case, each of the processors executes one or a plurality of programs including a group of instructions to cause a computer to perform an algorithm explained above with reference to the drawings.

The memory 93 may be formed by a volatile memory or a nonvolatile memory, however, the memory 93 may be formed by a combination of a volatile memory and a nonvolatile memory. The memory 93 may include a storage disposed apart from the processor 92. In this case, the processor 92 may access the memory 93 through an I/O interface (not shown).

In the example shown in FIG. 15, the memory 93 is used to store a group of software modules. The processor 92 can perform processes explained in the above-described embodiments by reading the group of software modules from the memory 93 and executing the read software modules.

As explained above, each of the configurations in the above-described embodiments may be constituted by the combination of hardware and software (a computer program). However, it may be constituted by one hardware or software, or may be constituted by a plurality of hardware or software.

The computer program includes instructions (or software codes) that, when loaded into a computer, cause the computer to perform one or more of the functions described in the embodiments. The computer program may be stored in a non-transitory computer readable medium or a tangible storage medium. By way of example, and not limitation, non-transitory computer readable media or tangible storage media can include a random-access memory (RAM), a read-only memory (ROM), a flash memory, a solid-state drive (SSD) or other memory technologies, CD-ROM, digital versatile disk (DVD), Blu-ray disc or other optical disk storage, magnetic cassettes, magnetic tape, magnetic disk storage or other magnetic storage devices. The computer program may be transmitted on a transitory computer readable medium or a communication medium. By way of example, and not limitation, transitory computer readable media or communication media can include electrical, optical, acoustical, or other form of propagated signals.

Note that the present disclosure is not limited to the above-described embodiments and can be modified as appropriate without departing from the spirit and scope of the present disclosure.

REFERENCE SIGNS LIST

100 model training apparatus
101 estimation unit
102 Artificial Convolutional Neural Network (ACNN) model training unit
200 ACNN model training system
201 count estimation unit
202 ACNN model training unit
211 feature point extraction unit
212 estimation unit

What is claimed is:

1. An apparatus comprising:
at least one memory storing instructions; and
at least one processor configured to execute the instructions to:
estimate a value of the number of Feature Pyramid Network (FPN) blocks included in an Artificial Convolutional Neural Network (ACNN) model by using a training dataset, wherein the estimating the value of the number of FPN blocks is based on the number of objects and feature points for each target class in the training dataset, and wherein the estimated value is a max value of the number of FPN blocks calculated for each target class in the training dataset;
train the ACNN model by using the estimated value; and
execute an image recognition task using the trained ACNN model.

2. The apparatus according to claim 1, wherein the ACNN model includes a Multi-Level Feature Pyramid Network (MLFPN) block including FPN blocks, and the at least one processor is further configured to:
estimate the value of the number of FPN blocks to be stacked in the MLFPN block.

3. The apparatus according to claim 1, wherein the at least one processor is further configured to:
extract feature points on images in the training dataset and use the feature points to estimate the value of the number of FPN blocks.

4. The apparatus according to claim 3, wherein the at least one processor is further configured to:
filter the extracted feature points and use the filtered feature points to estimate the value of the number of FPN blocks.

5. A method comprising:
estimating a value of the number of Feature Pyramid Network (FPN) blocks included in an Artificial Convolutional Neural Network (ACNN) model by using a training dataset, wherein the estimating the value of the number of FPN blocks is based on the number of objects and feature points for each target class in the training dataset, and wherein the estimated value is a max value of the number of FPN blocks calculated for each target class in the training dataset;
training the ACNN model by using the estimated value; and
executing an image recognition task using the trained ACNN model.

6. A non-transitory computer readable medium storing one or more instructions, that when executed by at least one processor, cause a computer system to:
estimate a value of the number of Feature Pyramid Network (FPN) blocks included in an Artificial Convolutional Neural Network (ACNN) model by using a training dataset, wherein the estimating the value of the number of FPN blocks is based on the number of objects and feature points for each target class in the training dataset, and wherein the estimated value is a max value of the number of FPN blocks calculated for each target class in the training dataset; and
train the ACNN model by using the estimated value; and
execute an image recognition task using the trained ACNN model.

* * * * *